(12) United States Patent
Righetti

(10) Patent No.: US 11,978,161 B2
(45) Date of Patent: May 7, 2024

(54) 3D MODELLING METHOD AND SYSTEM

(71) Applicant: NEW CHANGER TECH S.R.L., Rome (IT)

(72) Inventor: Giovanni Righetti, Hengelo (NL)

(73) Assignee: NEW CHANGER TECH S.R.L., Rome (IT)

( * ) Notice: Subject to any disclaimer, the term of this patent is extended or adjusted under 35 U.S.C. 154(b) by 39 days.

(21) Appl. No.: 17/830,063

(22) Filed: Jun. 1, 2022

(65) Prior Publication Data

US 2022/0392158 A1 Dec. 8, 2022

(30) Foreign Application Priority Data

Jun. 4, 2021 (IT) .......................... 102021000014645

(51) Int. Cl.
| | |
|---|---|
| G06T 17/10 | (2006.01) |
| G06F 3/01 | (2006.01) |
| G06T 7/521 | (2017.01) |
| G06T 15/04 | (2011.01) |
| G06T 15/20 | (2011.01) |

(52) U.S. Cl.
CPC .............. *G06T 17/10* (2013.01); *G06F 3/011* (2013.01); *G06F 3/016* (2013.01); *G06T 7/521* (2017.01); *G06T 15/04* (2013.01); *G06T 15/205* (2013.01)

(58) Field of Classification Search
CPC ......... G06T 17/10; G06T 17/00; G06T 7/521; G06T 15/04; G06T 15/205; G06T 19/20; G06T 2210/56; G06T 2219/2016; G06T 7/50; G06F 3/011; G06F 3/016; G01S 7/4808

See application file for complete search history.

(56) References Cited

U.S. PATENT DOCUMENTS

| | | | |
|---|---|---|---|
| 9,977,782 B2* | 5/2018 | Huston | G06F 16/954 |
| 11,055,909 B2* | 7/2021 | Kobayashi | G06T 17/00 |
| 11,153,503 B1* | 10/2021 | Ebrahimi Afrouzi | H04N 23/74 |
| 11,288,693 B2* | 3/2022 | Bronicki | G06Q 30/0601 |
| 11,354,693 B2* | 6/2022 | Bronicki | G06Q 10/0639 |
| 2013/0060540 A1 | 3/2013 | Frahm et al. | |
| 2013/0218787 A1 | 8/2013 | Powell | |
| 2014/0270480 A1 | 9/2014 | Boardman et al. | |
| 2015/0287246 A1 | 10/2015 | Huston | |
| 2019/0087976 A1 | 3/2019 | Sugahara et al. | |
| 2019/0184288 A1 | 6/2019 | Velic et al. | |
| 2020/0258299 A1 | 8/2020 | Kobayashi | |

FOREIGN PATENT DOCUMENTS

| | | |
|---|---|---|
| CN | 111179433 | 5/2020 |
| WO | 2013126784 | 8/2013 |

* cited by examiner

*Primary Examiner* — Vijay Shankar
(74) *Attorney, Agent, or Firm* — ALLEN, DYER, DOPPELT, + GILCHRIST, P.A.

(57) ABSTRACT

The present invention relates to a 3D (three-dimensional) modelling method and system. The 3D modelling method comprises capturing a plurality of digital images of an object, producing respective point cloud for the object, interpreting the plurality of digital images and the point cloud of the object to obtain a data information associated with the object, and generating a 3D model of the object based on the plurality of digital images, the point cloud, and the data information.

16 Claims, 2 Drawing Sheets

3D MODELLING METHOD AND SYSTEM

TECHNICAL FIELD

The present invention relates to a 3D (three-dimensional) modelling method and system. More particular, the 3D modelling method and system of the present invention are based on Visual Odometry, photogrammetry, and LiDAR.

PRIOR ART

Regarding 3D modelling of the related art, a skilled draftsman may use a 3D graphic software to draw a 3D object and generate corresponding 3D object data. Above manual 3D modelling is done by using 3D graphic software. Thus, an unskilled user cannot generate 3D object data.

For solving above problem, there is a commercially available 3D scanner. The 3D scanner can scan an object from one of different angles and measure depth of the object as well as generate 3D scanning data of different angles. Next, a user may use modelling software to perform a 3D modelling on the 3D scanning data of different angle in order to generate 3D object data corresponding to a target object.

However, the 3D scanner of the related art has the following drawbacks. Objects surrounding the target object (e.g., platform for supporting the target object, background, or other objects on the same platform) may be scanned in the scanning process. Thus, generated 3D scanning data may contain much noise, i.e., data not belonging to the target object. 3D object data is generated after the 3D scanning data containing noise is processed by 3D modelling. The 3D object data comprises other 3D object data not belonging to the target object.

Thus, the need for an improved 3D modelling method for solving above problems exists.

Known solutions are disclosed in the US patent application No. US 2020/258299 A1 or US 2015/287246 A1.

However, those documents fail to disclose how the plurality of digital images of an object are captured.

SUMMARY

An embodiment of the present disclosure relates to a 3D (three-dimensional) modelling method, comprising:
  capturing a plurality of digital images of an object;
  producing respective point cloud for the object;
  interpreting the plurality of digital images and the point cloud of the object to obtain a data information associated with the object; and
  generating a 3D model of the object based on the plurality of digital images, the point cloud, and the data information,
  wherein the plurality of digital images of the object are captured by a ToF (time-of-flight) camera,
  the point cloud for the object is produced by a ToF (time-of-flight) camera through autocorrelation of images of the object, and
  the 3D model of the object is provided with a textured mesh created by combining several point clouds obtained by autocorrelation of images and the ToF camera.

The TOF camera (which is part of the LiDAR family) generates a point cloud, and this is integrated with another point cloud generated by autocorrelation from the images.

According to the embodiment of the present invention, wherein the 3D model of the object is generated based on a virtual odometer algorithm.

According to the embodiment of the present invention, wherein the ToF camera includes a LiDAR (light detection and ranging) system.

According to the embodiment of the present invention, wherein the data information includes dimensional data associated with the object obtained through a photogrammetry.

According to the embodiment of the present invention, wherein the plurality of digital images and the point cloud are stored in a cloud-based server.

According to the embodiment of the present invention, wherein the 3D model of the object is provided with a textured mesh created by combining several point clouds, photograms, and ones obtained from the LiDAR system.

According to the embodiment of the present invention, wherein the 3D model of the object is editable, and wherein editions of the 3D model of the object includes rotating, moving, scaling, and measuring.

According to the embodiment of the present invention, wherein 3D vectors of the 3D model of the object and the mapping therebetween are generated over time.

Another embodiment of the present disclosure relates to a 3D modelling system for performing the 3D modelling method mentioned above, comprising a ToF (time-of-flight) camera, a cloud-based server, and an electronic device including a computer software for generating the 3D model of the object.

According to the embodiment of the present invention, wherein the ToF camera includes a 3D scanning module with a LiDAR system for capturing a plurality of digital images of the object and generating respective point cloud for the object.

According to the embodiment of the present invention, wherein the cloud-based server is configured to store the plurality of digital images and the point cloud of the object.

According to the embodiment of the present invention, wherein the computer software is configured to interpret the plurality of digital images and the point cloud of the object to obtain a data information associated with the object, and wherein the 3D model (obtained through the LiDAR camera) of the object is generated by the computer software based on the plurality of digital images, the point cloud, and the data information.

According to the embodiment of the present invention, wherein the data information includes dimensional data associated with the object obtained through a photogrammetry, and the 3D model of the object is generated based on a virtual odometry algorithm.

According to the embodiment of the present invention, the 3D modelling system further comprises a mobile phone in which the ToF camera is provided.

Features and advantages of the present invention will be disclosed with reference to the enclosed drawings relating to an indicative and a non-limiting implementation example.

DETAILED DESCRIPTION

Embodiments of the present invention will now be described, by way of example only, with reference to the accompanying drawings.

Figure 1:
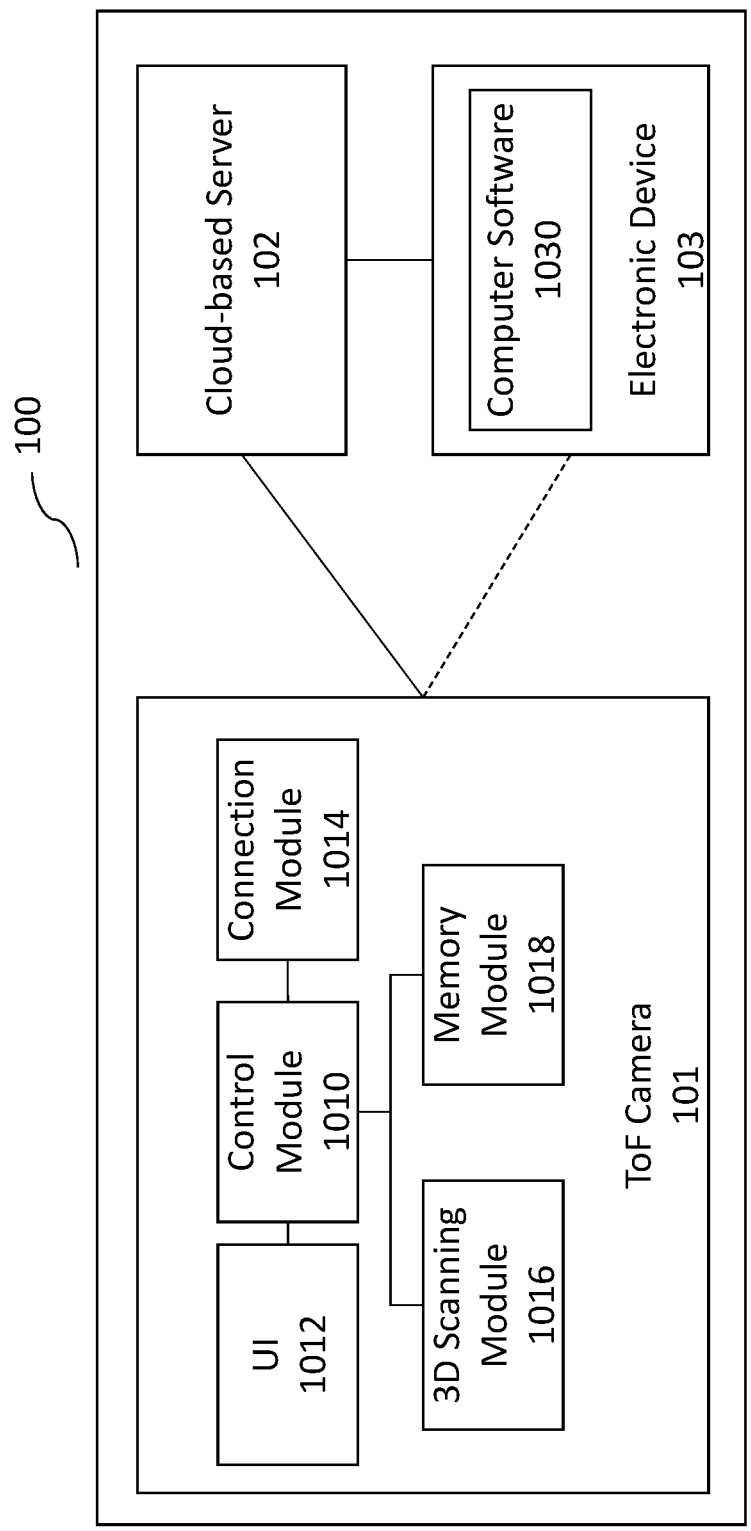
FIG. 1 shows a 3D modelling system according to an embodiment of the present invention.

Referring to FIG. 1, a 3D modelling system 100 according to an embodiment of the present invention is shown. A 3D modelling method of the present invention is performed in the 3D modelling system 100 which includes a ToF (time-of-flight) camera 101, a cloud-based server 102, and an electronic device 103.

According to the embodiment of the present invention, the ToF camera 101 is a range imaging camera system employing time-of-flight techniques to resolve distance between the camera and the subject for each point of the image, by measuring the round-trip time of an artificial light signal provided by a laser or an LED. In the embodiment of the present invention, the ToF camera1 101 includes a 3D scanning module 1016 having a LiDAR system (not shown) for determining ranges (variable distance) by targeting an object with a laser and measuring the time for the reflected light to return to the receiver. In an embodiment of the present invention, the ToF camera 101 may be provided in a mobile phone. In the embodiment of the present invention, the compass of the mobile phone can be used to define the surface planes and acquisition vectors when acquiring images of the object. In addition, a Global Positioning System (GPS) of the mobile phone can be also used to georeferenced the scanning.

The ToF camera 101 further includes a control module 1010, which is electrically connected to a user interface (UI) 1012, a connection module 1014, and a memory module 1018 as well as the 3D scanning module 1016.

The 3D scanning module 1016 includes an image fetching module and a depth meter (e.g., laser distance meter). The image fetching module is used to take a picture of an object from a specific angle and convert same into a 2D image. The depth meter is used to measure depth of each position in the 2D image, i.e., measuring a distance between the depth meter and the real position of each pixel of each 2D image. Next, the 3D scanning module 1016 processes each 2D image and a plurality of values of depth corresponding to the 2D image to generate point cloud. Therefore, the 3D scanning module 1016 may further generate many point cloud data of different angles by scanning the target object from different angles and measuring depths of the positions in the 2D image.

According to the embodiment of the present invention, an iterative algorithm can be used to recognize various objects (for example, radiant panels, etc.), such as 3D points cloud reconstruction and segmentation. In addition, the machine learning can be also used to recognize the objects to be modeled. In other words, the iterative algorithm is applied to identify and reconstruct 3D points cloud and their segmentation while the machine learning is used to recognize the objects to be modeled by classifying the dimensions of those objects.

Through the machine learning, the objects can be recognized accurately with the classification (therefore study of sets) of dimensions of the objects.

In an embodiment, the point cloud data is a combination of the 2D image and the depths and includes a plurality of point data each corresponding to a coordinate. The coordinate is, for example, a 3D coordinate which records a location of each point data in the point cloud data in a plane (expressed by X-coordinate and Y-coordinate) and its depth (expressed by Z-coordinate).

The memory module 1018 is used to store data. In an embodiment, the memory module 1018 is a non-volatile memory and is used to store scanning software (e.g., firmware of the 3D scanning module 1016). The scanning software is embedded with computer executable codes. The control module 1010 executes the scanning software. Thereafter, the scanning software performs steps of the 3D modelling method of the present invention.

The connection module 1014 is coupled with the cloud-based server 102 through a wireless communication manner. In the embodiment of the present invention, a plurality of digital images of the object captured by the ToF camera 101 and the point cloud of the object generated by the ToF camera 101 can be sent to and stored in the cloud-based server 102. In the embodiment of the present invention, the electronic device 103 can access the cloud-based server 102 for the plurality of digital images and the point cloud of the object.

Alternatively, the connection module 1014 can be also directly connected to the electronic device 103 and is adapted to send scanned data to the electronic device 103. In the embodiment of the present invention, the connection module 1014 may include a USB module, a PCI bus module, a Wi-Fi module or a Bluetooth® module.

The UI (e.g., keyboard, keypad, display, buzzer or any combination of above components) 1012 is used to receive user input and output alert information.

According to the embodiment of the present invention, the control module 1010 is used to control overall operations of the ToF camera 101.

In an embodiment of the present invention, a computer software 1030 is stored in a memory (not shown) of the electronic device (e.g., a laptop, a tablet computer, or a personal computer) 103. The memory is a non-volatile memory. The computer software 1030 records computer executable codes. A processor (not shown) of the electronic device 103 executes the computer software 1030. Thereafter, the computer software 1030 performs steps of the 3D modelling method of the present invention based on 3D scanning data (e.g., digital images and point cloud data discussed later) generated by the ToF camera 101.

In an embodiment of the present invention, the computer software 1030 is further configured to interpret the plurality of digital images and the point cloud of the object to obtain a data information associated with the object. According to the embodiment of the present invention, the 3D model of the object is generated by the computer software 1030 based on the plurality of digital images, the point cloud, and the data information.

Alternatively, and additionally, the software 1030 can be configured as a telephone application to be installed in the mobile phone. When the data associated with the modelling of the object is available, the telephone application can be run on the mobile phone to model the object. In addition, the data can be further updated by the mobile phone through framing the object under examination.

The whole invention may be implemented on a mobile phone.

In an embodiment of the present invention, the data information may include dimensional data associated with the object obtained through a photogrammetry. According to the embodiment of the present invention, the photogrammetry is a technology of obtaining reliable information about physical objects and the environment through the process of recording, measuring and interpreting photographic images and patterns of electromagnetic radiant imagery and other phenomena. One example is the extraction of three-dimensional measurements from two-dimensional data (i.e., images); for example, the distance between two points that lie on a plane parallel to the photographic image plane can be determined by measuring their distance on the image, if the scale of the image is known. Another is the extraction of accurate color ranges and values representing such quantities as albedo, specular reflection, metallicity, or ambient occlusion from photographs of materials for the purposes of physically based rendering.

Figure 2:
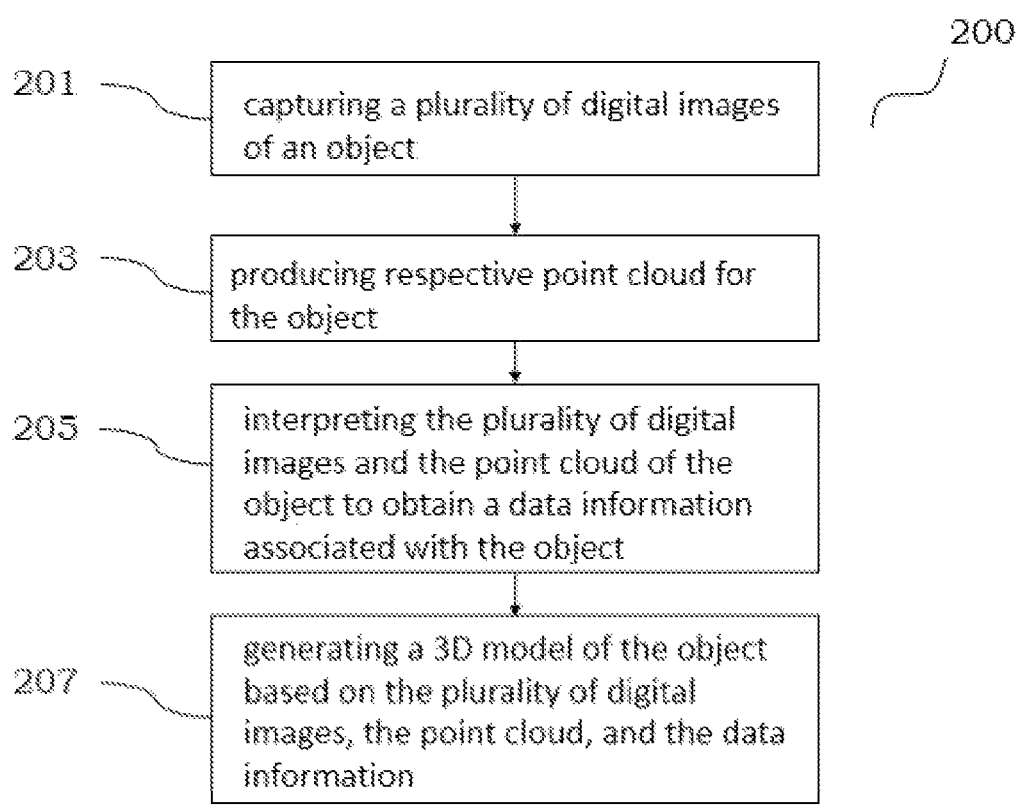
FIG. 2 shows a flow chart of a 3D modelling method according to an embodiment of the present invention.

FIG. 2 shows a flow chart of a 3D modelling method 200 according to an embodiment of the present invention. Implementation of the 3D modelling method 200 of the present invention is tied to the 3D modelling system 100 shown in FIG. 1. The 3D modelling method 200 of the present invention comprises the following steps.

At 201, the 3D modelling method 200 comprises capturing a plurality of digital images of an object.

At 203, the 3D modelling method 200 comprises producing respective point cloud for the object.

At 205, the 3D modelling method 200 comprises interpreting the plurality of digital images and the point cloud of the object to obtain a data information associated with the object.

At 207, the 3D modelling method 200 comprises generating a 3D model of the object based on the plurality of digital images, the point cloud, and the data information.

According to the embodiment of the present invention, a user operates the ToF camera 101 to repeatedly scan a target object from one of a plurality of different angles. The control module 1010 of the ToF camera 101 instructs the 3D scanning module 1016 to obtain 2D images of the target object from different angles and sets of depths of the target object in the scanning process. The depths correspond to pixels of the 2D images respectively. Finally, the control module 1010 generates point cloud data of different angles corresponding to different angles of the target object based on the 2D images of the target object and sets of depths of the target object. In an embodiment, the point cloud data include a plurality of point data each corresponding to one of a plurality of pixels of the 2D image. Next, the control module 1010 sends the images and point cloud data to the cloud-based server 102 to be accessed by the electronic device 103. Alternatively, the ToF camera may be also directly connected to the electronic device for data communication through the connection module 1014. In this embodiment, the memory module 1018 includes a releasable data storage device (e.g., external hard disk drive or memory card) and the control module 1010 can store point cloud data in the releasable data storage device. Next, the user may detach the releasable data storage device from the ToF camera 101 and connect the releasable data storage device to the electronic device 103. Thus, the electronic device 103 may read the point cloud data and also the 2D images from the ToF camera 101 directly.

According to the embodiment of the present invention, the 3D scanning module 1016 of the ToF cameral 101 may include a LiDAR system (not shown) for determining ranges (variable distance) by targeting an object with a laser and measuring the time for the reflected light to return to the receiver.

According to the embodiment of the present invention, the computer software 1030 is configured to interpret the plurality of digital images and the point cloud of the object to obtain a data information associated with the object. According to the embodiment of the present invention, the 3D model of the object is generated by the computer software 1030 based on the plurality of digital images, the point cloud, and the data information.

According to the embodiment of the present invention, the data information obtained through interpreting the plurality of digital images and the point cloud of the object may include dimensional data associated with the object, which is obtained through a photogrammetry. In the embodiment of the present invention, the photogrammetry is a technology of obtaining reliable information about physical objects and the environment through the process of recording, measuring and interpreting photographic images and patterns of electromagnetic radiant imagery and other phenomena. One example is the extraction of three-dimensional measurements from two-dimensional data (i.e., images); for example, the distance between two points that lie on a plane parallel to the photographic image plane can be determined by measuring their distance on the image, if the scale of the image is known. Another is the extraction of accurate color ranges and values representing such quantities as albedo, specular reflection, metallicity, or ambient occlusion from photographs of materials for the purposes of physically based rendering.

In the embodiment of the present invention, the 3D modelling method and system employ a combined technology of LiDAR of a ToF camera, virtual odometer, and point cloud of the object to be modeled. Thanks to the combination, a 3D model of the object can be generated with a textured mesh in centimeters.

According to an embodiment of the present invention, graphical images of the object can be generated from the point clouds. In the images, the mesh or the textured mesh are provided, which are created by combining several point clouds obtained by autocorrelation of images and a camera ToF (i.e., a LiDAR). In the embodiment of the present invention, many details of the object can be provided in the cloud, which is not measurable or scalable. However, in the final 3D model of the object, details of the object can be measured.

Furthermore, according to the embodiment of the present invention, it is moreover possible to perform measurements of distances between points and to obtain the real distance calculated by working on the 3D model of the object. It is also possible to calculate the relative heights of the points. The 3D model of the object can also offer the perspective and orthogonal vision, which allows the operations of zoom, pan, rotation and shift to be performed.

In addition, the 3D model of the object obtained through the 3D modelling method and system of the present invention can be viewed in different form, such as textured mesh, point cloud, or spherical image. According to an embodiment of the present invention, the spherical image of the object can be measurable. In this case, the 3D model of the object deriving from the point clouds is associated with a 360-degree image.

Although specific examples have been illustrated and described herein, those of ordinary skill in the art will appreciate that an arrangement to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

That which is claimed is:

1. A 3D (three-dimensional) modelling method, comprising:
capturing a plurality of digital images of an object;
producing a point cloud for the object;

interpreting the plurality of digital images and the point cloud for the object to obtain data information associated with the object; and generating a 3D model of the object based on the plurality of digital images, the point cloud, and the data information, wherein the plurality of digital images of the object are captured by a ToF (time-of-flight) camera, the ToF camera comprising a LiDAR (light detection and ranging) system, the point cloud for the object being produced by the ToF camera through autocorrelation of images of the object, the 3D model of the object being provided with a textured mesh created by combining several point clouds obtained by autocorrelation of images and the ToF camera, wherein the 3D model of the object is generated based on a virtual odometer algorithm, wherein 3D vectors of the 3D model of the object and mapping therebetween are generated over time, and wherein the 3D modelling employs combined technology of the LiDAR of the ToF camera, the virtual odometer, and the point cloud of the object to be modelled.

2. The 3D modelling method of claim 1, wherein the data information includes dimensional data associated with the object obtained through photogrammetry.

3. The 3D modelling method of claim 1, wherein the plurality of digital images and the point cloud are stored in a cloud-based server, and wherein the 3D model of the object is editable, and wherein editions of the 3D model of the object include rotating, moving, scaling, and measuring.

4. The 3D modelling method of claim 1, wherein when the data associated with the modelling of the object are available, a telephone application is run on a mobile phone to model the object so that said data can be further updated by the mobile phone through framing the object under examination.

5. The 3D modelling method of claim 4, wherein a compass of the mobile phone is used to define surface planes and acquisition vectors when acquiring images of the object.

6. The 3D modelling method of claim 5, wherein a Global Positioning System (GPS) of the mobile phone is also used to georeferenced the scanning phase.

7. The 3D modelling method of claim 1, wherein an iterative algorithm is used to recognize various objects, and wherein machine learning is also used to recognize the objects to be modeled by classifying dimensions of the objects.

8. A 3D modelling system for performing the 3D modelling method of claim 1, comprising the ToF camera, a cloud-based server, and an electronic device including computer software for generating the 3D model of the object.

9. The 3D modelling system of claim 8, wherein the ToF camera includes a 3D scanning module with the LiDAR system for capturing the plurality of digital images of the object and generating the point cloud for the object.

10. The 3D modelling system of claim 9, wherein the cloud-based server is configured to store the plurality of digital images and the point cloud for the object.

11. The 3D modelling system of claim 9, wherein the computer software is configured to interpret the plurality of digital images and the point cloud for the object to obtain the data information associated with the object, and wherein the 3D model of the object is generated by the computer software based on the plurality of digital images, the point cloud, and the data information.

12. The 3D modelling system of claim 11, wherein the data information includes dimensional data associated with the object obtained through photogrammetry.

13. The 3D modelling system of claim 8, further comprising a mobile phone in which the ToF camera is provided.

14. The 3D modelling system of claim 13, wherein a compass of the mobile phone is used to define surface planes and acquisition vectors when acquiring images of the object, and wherein a Global Positioning System (GPS) of the mobile phone is also used to georeference the scanning phase.

15. The 3D modelling system of claim 13, wherein when the data associated with the modelling of the object are available, a mobile application is run on the mobile phone to model the object so that said data can be further updated by the mobile phone through framing the object under examination.

16. The 3D modelling system of claim 8, wherein an iterative algorithm is used to recognize various objects, and wherein machine learning is also used to recognize the objects to be modeled by classifying dimensions of the objects.

* * * * *